Aug. 11, 1959
J. V. FOSTER
2,898,889
MECHANICALLY-LIMITED, ELECTRICALLY OPERATED HYDRAULIC
VALVE SYSTEM FOR AIRCRAFT CONTROLS
Filed Oct. 3, 1958
3 Sheets-Sheet 2
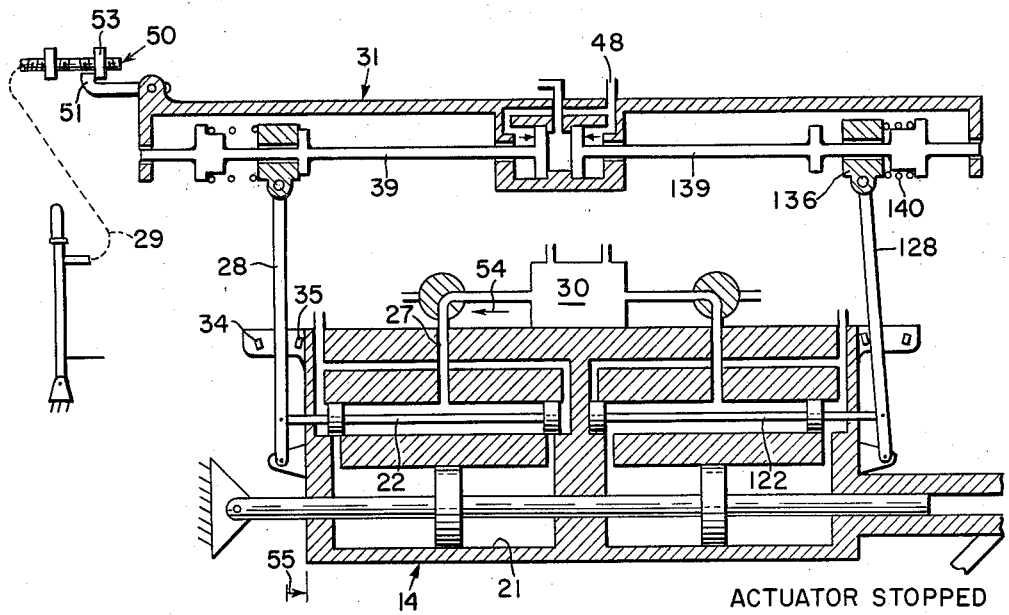
Fig. 1b (SERVO FAILURE – AUTOMATIC STOP)
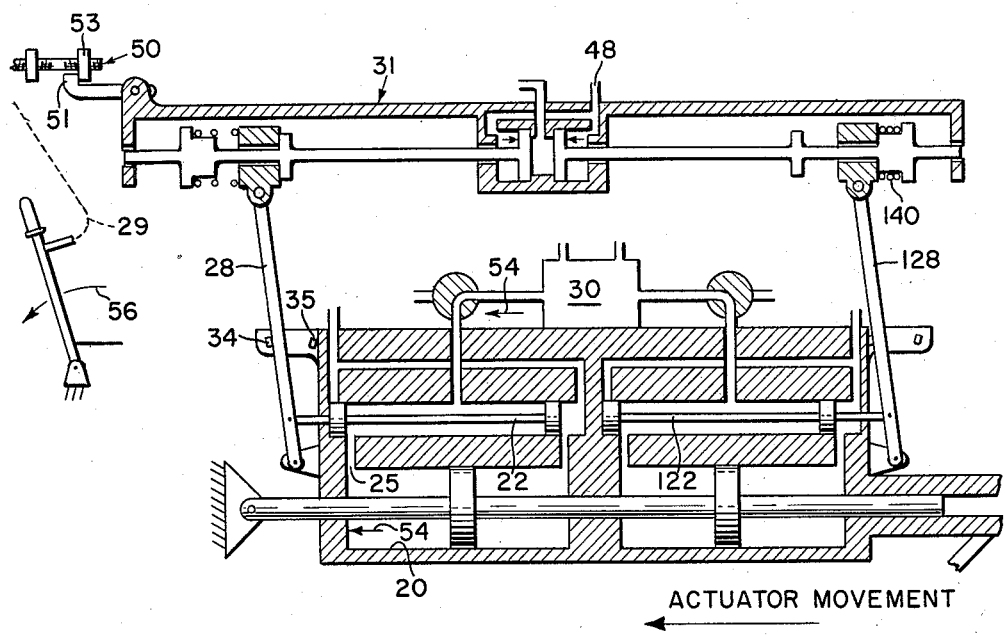
Fig. 1c (SERVO FAILURE – PILOT OVERRIDE)
INVENTOR.
JOHN V. FOSTER
BY
ATTORNEYS

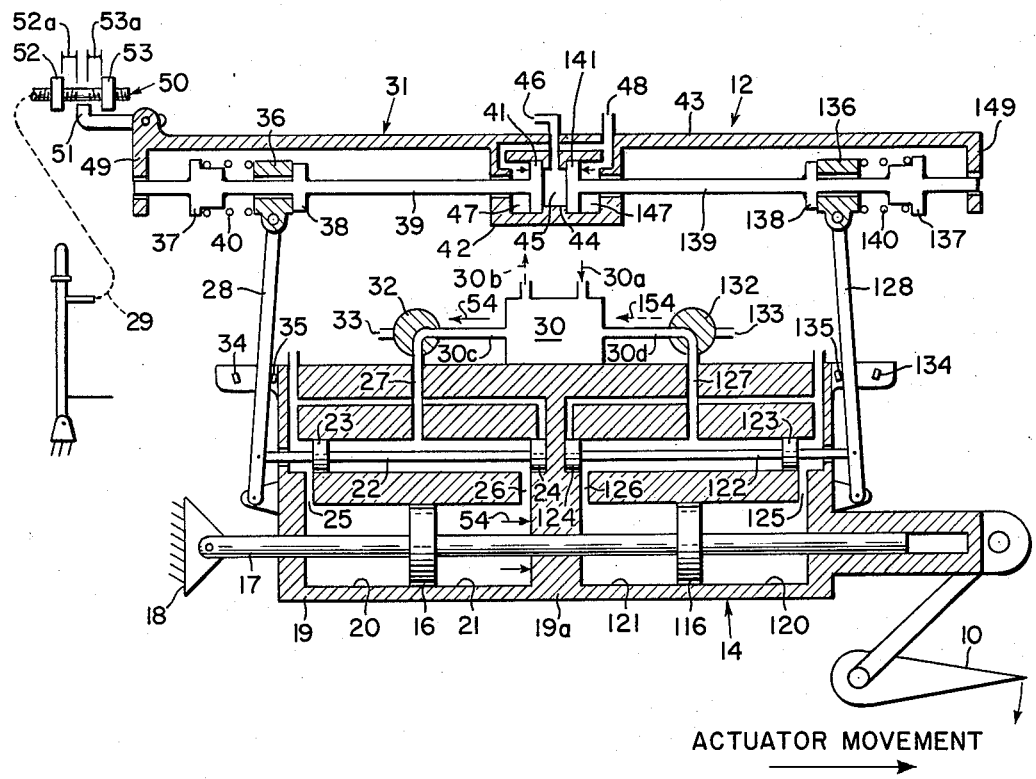
Fig. 1a (NORMAL SERVO CONTROL)

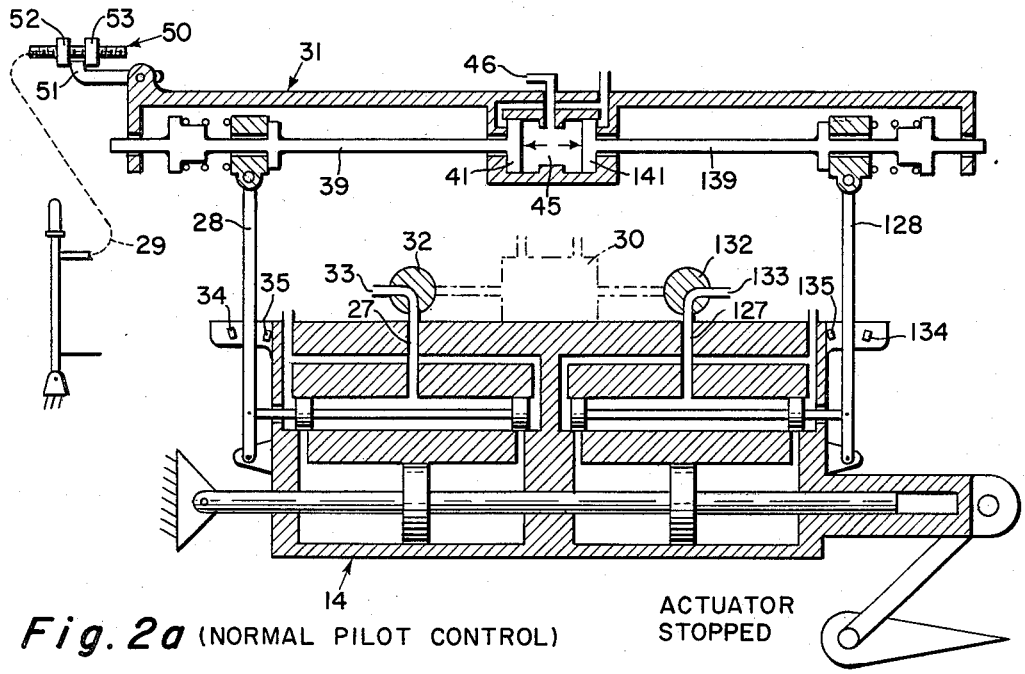
Fig. 2a (NORMAL PILOT CONTROL) — ACTUATOR STOPPED
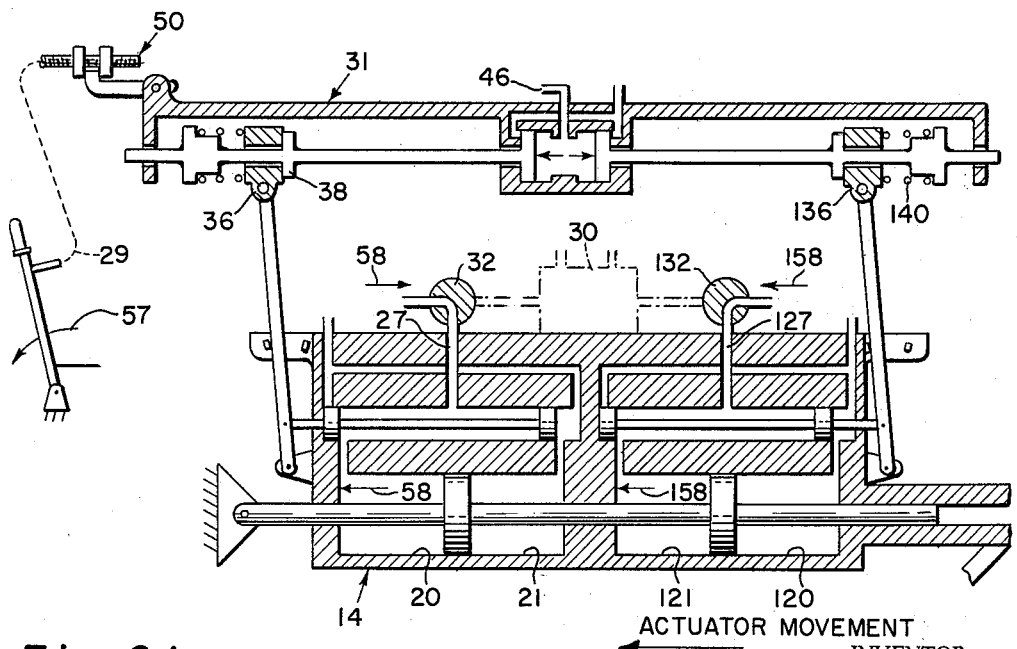
Fig. 2b (NORMAL PILOT CONTROL) — ACTUATOR MOVEMENT
INVENTOR.
JOHN V. FOSTER
BY
ATTORNEYS

2,898,889

MECHANICALLY-LIMITED, ELECTRICALLY OPERATED HYDRAULIC VALVE SYSTEM FOR AIRCRAFT CONTROLS

John V. Foster, Los Altos, Calif., assignor to the United States of America as represented by the Secretary of the Navy Application October 3, 1958, Serial No. 765,264

8 Claims. (Cl. 121—38)

(Granted under Title 35, U.S. Code (1952), sec. 266)

This invention described herein may be manufactured and used by or for the Government of the United States of America for governmental purposes without the payment of any royalties thereon or therefor.

This invention relates to aircraft control systems, and more particularly to such a system which combines a high performance electrically controlled hydraulic valve and mechanically operated hydraulic valves through a control linkage to obtain more precise and flexible flight operation.

Mechanically operated hydraulic valves and high performance electrically operated hydraulic valves have been used separately in control systems for air craft. In a modern mechanically operated control system, the pilot's stick mechanically operates a hydraulic valve which actuates a piston for positioning the control surface. This system is frequently referred to as an irreversible, artificial feel system. An inherent characteristic of such mechanically operated hydraulic valves is that they have a large lap or dead zone, and in addition, these valves are associated with a relatively large mass actuating mechanism. As a result of these factors, precise control over small surface deflections and good high-frequency dynamic performance are difficult to achieve with control systems utilizing straight mechanically operated hydraulic valves. It should be noted, however, that these features of mechanically operated valves may be desirable to the pilot in direct manual control, especially, during landing and take off as it provides a characteristic "feel" of aircraft response. Another disadvantage of the direct mechanically operated hydraulic valve is the lack of flexibility from multiple command sources.

In recent years, very high performance electro-hydraulic valves have been developed in which the oil flow through the valve is proportional to coil current with essentially no dead zone near the zero flow region. Furthermore, high dynamic performance of the electrohydraulic valves has been achieved by restricting the internal parts, such as the spools, to small sizes and consequently to a mechanism having a small mass. While the electrohydraulic valves are not subject to the aforedescribed disadvantages of the straight mechanically operated hydraulic valves, being electrically operated they have a greater susceptibility to failure of a type which can cause dangerous surface deflections exceeding design limitations.

Some prior art aircraft control surface systems have attempted to overcome the disadvantages of the straight mechanically operated valves by utilizing a mechanical valve which can be driven by either a servo electric motor or by a pilot's mechanical override linkage. Such a system is illustrated in U. S. Patent No. 2,823,879. In the patented system, the servomotor is directly connected to one end of a spool valve for normal operation. For emergency operation, the pilot's stick is connected to the other end of the spool valve through a lost motion connection. Thus in normal operation the servomotor actuates a mass including the spool valve, while in emergency override operation, the pilot actuates the mass including the spool valve plus the servomotor. Thus, the mass of the mechanical valve must be actuated both in servo and manual controls making the controls interdependent. While it may be desirable to provide the pilot in manual control with the dead zone and mass characteristics of a spool valve, as heretofore described, these characteristics in servo control will compromise the use of high performance electrohydraulic valves now available.

According to the present invention, a surface control system has been designed which incorporates the advantages of both a mechanical operated control valve and an electrically controlled hydraulic servo valve. In general, this novel result has been accomplished by a configuration in which a pilot's override linkage and the mechanical control valve are mechanically independent of the electrically controlled hydraulic servo valve. The system includes an hydraulic actuator having a movable member, i.e., a cylinder articulated to the control surface, the cylinder having tandem chambers in which are disposed a pair of double acting tandem pistons, and in this example anchored to the aircraft structure. Both sides of each piston is connected to a cognizant mechanical control valve for porting pressurized fluid from a single servo valve to either side of the corresponding piston depending on the desired motion of the actuator and the control surface connected thereto. The servo valve is a commercially available high performance, proportional type electrohydraulic valve which admits fluid to either one of the mechanical valves, or blocks fluid to both, depending on the polarity of the current, or the absence of current, respectively.

Each mechanical control valve is connected to the pilot's stick linkage through a flexible control arm actuating mechanism via an authority limiter device. The actuating mechanism is provided with a two-positioning means; providing and "arms-in" position in which the control arms are positioned for servo control being movable independently of each other for emergency pilot control in the event of servo failure, and an "arms-out" position in which the control arms are locked together enabling the mechanical valves to be operated together as a single valve for normal manual pilot control. In normal pilot control, a transfer valve is provided to block the inactive servo valve and to substitute a separate pressurized fluid source to operate the hydraulic actuator.

A principal object of this invention is to provide an aircraft surface control system having a more precise and dynamic operation in servo control with the safety features of a pilot-controlled mechanical override in the event of servo failure.

Another object of this invention is to provide such a surface control system which permits full electrical control through a proportional type electrically operated hydraulic servo valve with the reliability of an automatic mechanically operated hydraulic valve for override control in the event of servo failure.

Other objects and many of the attendant advantages of this invention will be readily appreciated as the same becomes better understood by reference to the following detailed description when considered in connection with the accompanying drawings wherein:

Fig. 1a is a schematic hydraulic circuit diagram of the novel aircraft control surface system in normal servo control operation, the servo valve porting fluid to the left mechanical control valve and moving the hydraulic actuator to the right;

Fig. 1b is a view similar to Fig. 1a after servo failure, the authority limiter stopping the actuator movement by neutralizing the left mechanical control valve;

Fig. 1c is a view similar to Fig. 1b wherein the pilot reverses the original servo movement of the actuator by actuating his stick linkage;

Fig. 2a schematic hydraulic circuit diagram of the aircraft control surface system in normal pilot manual control, the control arms being locked together in neutral by a two-position device and the hydraulic actuator at rest as a result of no pilot input to his linkage; and Fig. 2b is a view similar to Fig. 2a with the pilot inserting a left mechanical input in the linkage pivoting both arms simultaneously to the left, the hydraulic actuator moving in the same direction.

Referring to the drawing where like reference numerals designate similar parts throughout the drawing there is shown in Fig. 1a a control surface 10, such as a pivotally mounted horizontal stabilizer of a conventional aircraft, driven by an electrohydraulic control system 12 of this invention. The system comprises a hydraulic motor or actuator 14 including tandem spaced pistons 16, 116 secured on a common piston rod 17 pivotally anchored at one end to the aircraft frame at 18, the pistons being housed in an actuator cylinder 19 which moves relative thereto. Pistons 16 and 116 are disposed to the left and right side of the drawing, respectively, the designation of left and right hereafter used as a convenience in the description of components and of actuator movements in the drawing, and has no significance as to aircraft movement. In addition, many of the components on the left side of the control system will have an identical component on the right side as a mirror image, and the component on the right side will have a corresponding number as the one on the left with an added prefix 1, i.e., left and right pistons 16, 116, respectively.

Pistons 16, 116 are disposed in cylinder chambers 20, 21, and 120, 121, respectively, being separated by cylinder wall 19a. Reciprocal movement of actuator cylinder 19 (and the control surface) is controlled mechanically by spool valves 22, 122, which can be formed in the cylinder housing parallel to and in laterally disposed relation to the respective piston chambers. The control valves have two spaced lands 23, 24 and 123, 124 adapted to block associated passages 25, 26, and 125, 126 leading to the piston chambers, the lands being movable to either side of the passages depending on which chambers the pressurized fluid in passages 27, 127 is to be ported and vented. Passages 27, 127 are ported to the respective valves and intermediately by means of their lands to the associated chamber passages enabling the flow to either side of each piston to be reversed by a movement of the corresponding control valve. The ends of valves 22, 122 are suitably vented. Control valves 22, 122 are pivotally connected to control arms 28, 128, respectively, each arm being pivotally connected at opposite ends to the actuator cylinder 19 and to a pilot's joy stick linkage 29.

The aforedescribed mechanism except for modifications due to this invention is a standard dual-hydraulic aircraft control system used in modern aircraft. The contribution of this invention is the combination therewith of a high performance, proportional type, electrohydraulic servo valve 30 to control the porting of pressurized fluid to the respective control valves via passages 27 or 127, and the utilization of a special flexible control-arm actuating mechanism 31 interposed between the pilot's linkage 29 and the respective control arms to provide a servo override control in a manner to be described.

Servo valve 30 is of a commercially available type, such as a Model 2000 Series, manufactured by The Moog Valve Company, Inc. of East Aurora, New York. Valve 30 is controlled by an electrical signal input which may include a mixture of pilot and other sources of command. The servo valve is a four-way spool valve provided with a pressure inlet 30a connected to a suitable fluid source, i.e., pressurized oil, a return outlet 30b, and two pressure outlets 30c and 30d connected to passages 27 and 127 through transfer valves 32, 132, respectively. This type of servo valve operates to apply pressurized oil from inlet 30a to mechanical control valve 22 via outlet 30c and passage 27 when the control current to the valve is one polarity, and pressurized oil to valve 122 via outlet 30d and passage 127 when the current is of the other polarity. It is apparent that these paths are reversible, that is, when one is used to admit oil to one piston, the other path acts as a return oil path from the other piston. In the absence of current servo valve 30 blocks both outlets 30c and 30d. The amount of oil passed by valve 30 to the control valves 22 and 122 is proportional to the magnitude of the current.

Transfer valves 32, 132 are remotely controlled in any suitable manner to one of two positions; in the servo control position shown in Figs. 1a–1c the transfer valves pass oil from the servo valve to the mechanical control valves, and in the normal manual control position shown in Figs. 2a and 2b, the transfer valves are switched to block servo valve outlets 30c and 30d, and to admit oil from pressure sources 33, 133, which may be the same source as 30a only bypassing servo valve 30.

The pivotal movements of control arms 28, 128 by actuating mechanism 31 to position mechanical control valves 22, 122 are limited between stops 34, 35 and 134, 135, respectively, formed integrally with actuator cylinder 19. As will be later described more fully, a movement of the control arms to the left or right will effect a corresponding movement of the actuator. The control arms are pivotally connected to mechanism 31 by sleeves 36, 136 slidably movable between two fixedly spaced shoulders 37, 38 and 137, 138 integrally formed on push rods 39, 139. Compression coil springs 40, 140 are disposed between stops 37, 137 and the respective sleeves and bias the sleeves normally inwardly against respective shoulders 38, 138 (Figs. 1a, 2a, and 2b), while permitting a relative movement therebetween at which time the inner stop is moved from the sleeve further compressing the spring (Figs. 1b and 1c). In other words, springs 40, 140 provide a one-way resilient connection between the control arms and the actuating mechanism to permit a pilot over-ride action by independent movement of a cognizant control arm during servo failure.

One of the features of control arm mechanism 31 is a two-position, or extensible link, device for positioning the control arms in one of two normal positions, namely, a servo control position "arms-in" and a manual control position "arms-out." In the "arms-in" position, control arms 28, 128 are resiliently forced by springs 40, 140 against the inner stops 35, 135; and in the "arms-out" position the control arms are centered between the respective pair of stops by the abutment of the inner shoulders 38, 138 bearing against the sleeves.

A preferred two-position device is hydraulically operated and servo controlled, and comprises a pair of plungers 41, 141 integrally formed on the inner ends of the respective push rods 39, 139 and slidably housed in a cylinder 42 being integral with frame 43 of the actuating mechanism: Cylinder 42 is provided with an intermediate shoulder 44 forming a central chamber 45 having an inlet 46, and end chambers 47, 147 having a common inlet 48. When pressurized oil from a suitable source is admitted in inlet 48 the push rods are pulled in ("arms-in") as in Figs. 1a–1c for normal servo control. When oil is admitted in inlet 46 the push rods are pushed out ("arms-out") as in Figs. 2a and 2b for normal manual control. The ends of the push rods opposite the plungers are slidably guided by ears 49, 149 of frame 43 enabling relative movement of the arms with respect to frame 43.

Actuating mechanism 31 is connected to pilot joy stick linkage 29 through an authority limiter 50 having adjustably mounted limits 52, 53 extending in the path of a lug 51 on frame 43. Spaces 52a and 53a between the respective limits and lug 51 provide a controlled amount of freedom of movement, so-called "slop," between control arm actuating mechanism 31 and pilot stick linkage 29 in each direction of actuator movement in servo operation. As long as the actuator movement does not exceed the freedom allowed by spaces 52a and 53a, actuating mechanism 31, and the control arms, remain in the spring-biased servo control position illustrated in Figs. 1a–1c. If, on the other hand, some servo failure, i.e., faulty signal or sticking valve causes actuating mechanism 31 to be driven past the authority limit, the movement of hydraulic actuator is stopped (Fig. 1b), or reversed (Fig. 1c) as will be later described. It should be noted that the authority limits 52 and 53 are set to provide sufficient clearance for desired extra electrical inputs such as damping and other stability signals without motion feedback to the pilot. The adjustment of limits 52 and 53 may be remotely controlled in any conventional manner.

The operation of the invention control surface system will be described with reference to two normal primary modes of operation, namely, automatic servo control illustrated Fig. 1a–1c inclusive, and pilot manual control illustrated Figs. 2a and 2b.

In Fig. 1a the system is illustrated in "normal servo control." Plungers 41, 141 are in an innermost position by admission of oil in chambers 47, 147, and the control arms 28, 128 are in a corresponding "arms-in" position under the action of springs 40, 140 wherein servo valve 30 can direct oil either to chamber 21 for an "actuator-right" movement, or to chamber 121 for an "actuator-left" movement, depending on the polarity of the signal being transmitted to servo valve 30. As an example, it is assumed in Fig. 1a that servo valve 30 has been directed to move actuator 14 to the "right." Oil shown by solid arrows 54 via valves 32 and 22 (the latter being the cognizant control valve) to chamber 21 forcing cylinder wall 19a to the right (pistons 16, 116 being fixed at 18). Chamber 121 of piston 116 is vented through, control valve 122 and servo valve 30 as indicated by broken arrow 154. If the polarity of the current signal to servo valve 30 is reversed, the direction of oil flow 54 and 154 is also reversed, valve 122 becoming the cognizant valve and in a position to port pressurized oil in line 127 to move actuator 14 to the "left" (not illustrated).

The aforedescribed "normal servo control" is maintained as long as the control arm mechanism 31 (and actuator 14 which supports the mechanism) moves within the preset limits of authority limiter 50. This achieves a primary object of the invention; that is, to obtain full electric control of the hydraulically operated actuator.

Figs. 1b and 1c illustrate the system of Fig. 1a (actuator-right) under a servo failure, i.e., electrical malfunction, wherein uncontrolled continuous oil flow 54 from servo valve 30 has caused the hydraulic actuator to move the distance represented by arrow 55. During this movement, control arm actuating mechanism 31 is driven past the authority limit (space 53a) whereupon stop 53 engages lug 51 and restrains further movement of mechanism 31. However, the hydraulic actuator continues its movement to the right causing control arm 28 to be pivoted about the stationary mechanism 31 until control valve 22 is centered between stops 34, 35 at which position valve 22 blocks oil flow in passage 27 to chamber 21 and stops the actuator movement (Fig. 1b). It is noted that throughout this movement control arm 128 remains unaffected in the servo position by spring 140, the latter being only further compressed by relative movement between sleeve 136 and the rod 139 and providing a one-way resilient connection between the control arm and its actuating mechanism.

With actuator 14 stopped in Fig. 1b by the authority limiter 50, the pilot can exert his override control illustrated in Fig. 1c by pulling his linkage 29 to the left, indicated by arrow 56, moving actuator mechanism 31 and control arm 28 in the same direction, the latter as far as stop 34. This manual movement of control arm 28 to the left, moves cognizant control valve 22 to the left of center, opening passage 25 and admitting oil flow 54 to chamber 20 and the actuator moves to the left, reversing its original direction in Fig. 1a. The right side of the system remains unchanged over Fig. 1b except for a still further compression of spring 140. Operation is similar when servo failure occurs in a normal actuator movement to the right (not illustrated).

The runaway motion has been automatically stopped before it can cause any large deflection, and the pilot's natural reaction will permit him to assume control and change the direction of deflection. Thus, the mechanism achieves a second principal objective of providing immediate and automatical override control in the event of servo failure.

Fig. 2a illustrates the invention system in normal manual control by the pilot in which actuator 14 is operated as a conventional standard dual-hydraulic system, providing another safety feature in addition to the pilot override safety provision previously described in servo control (Figs. 1a–1c). Servo valve 30 is illustrated in phantom lines to indicate an inactive condition. Normal pilot control is initiated by actuating two-way position device to the "arms-out" position (oil pressure in inlet 46) which locks together control arms 28, 128 and actuating mechanism 31, the arms being centered between the respective stops and control valves being in a centered position. Transfer valves 32, 132 are rotated by remote control to isolate servo valve 30, and connect control valve inlets 27, 127 with oil pressure in source lines 33, 133. Simultaneously, the authority limiter 50 is set with zero freedom (spaces 52a and 53a in Figs. 1a–1c reduced to zero) to provide the pilot with direct mechanical control without excess lost motion. As shown in Fig. 2a, hydraulic actuator 14 is at rest in the absence of a pilot input through linkage 29.

An input in pilot's linkage 29, for example, to the left as illustrated by arrow 57 in Fig. 2b, carries actuating mechanism, both control arms, and both mechanical control valves all in the same direction, admitting oil pressure flow 58, 158 from sources 33 and 133, to chambers 20 and 121, respectively, causing hydraulic actuator 14 to also move in the same direction, namely, to the left. It is noted that both control arms are moved in the same direction, control arm sleeve 36 being abutted by inner shoulder 38, and control arm sleeve 136 being moved by spring 140.

If the pilot stops the linkage movement, both control arms eventually will be restored to the centered position by the hydraulic actuator motion, as in Fig. 2a. A further movement of the pilot linkage to the right beyond the neutral position, will move both control arms to the right, and oil pressure from 33 and 133 will be ported to chambers 21 and 120 causing the hydraulic actuator to move to the right (not illustrated). Whereas, in servo control (Figs. 1a–1c) control arms 28, 128 are so arranged by actuating mechanism 31 to be independently movable, in normal manual control (Figs. 2a and 2b), the control arms are locked together by mechanism 31 to act in unison.

The foregoing described control surface system enables optimized use of an electrically controlled hydraulic servo valve without sacrificing performance by eliminating the mass normally associated with pilot override devices. This is accomplished by a design in which the override mechanism is essentially independent of the servo valve. A further feature of this invention is the ability of the system to revert to full mechanical control, through the employment of the two-position device, wherein the pilot is able to take advantage of the dead zone inherent in mechanical valves. Summarizing, the invention utilizes the desirable features of both electrohydraulic servo valves and mechanical valves through a special linkage to achieve an improved aircraft control system.

Obviously many modifications and variations of the present invention are possible in the light of the above teachings. It is therefore to be understood that within the scope of the appended claims the invention may be practiced otherwise than as specifically described.

I claim:

1. An aircraft control system for effecting movement of a control surface comprising a hydraulic actuator having a driven member articulated to said control surface; a source of pressurized fluid for driving said driven member; a pair of mechanically operated hydraulic valves for controlling the porting of said fluid to said driven member and for determining the direction of actuator movement; an electrically operated hydraulic servo valve hydraulically interposed between said source of pressurized fluid and said pair of control valves for alternatively porting said fluid to said control valves in response to electrical command signals; pilot stick linkage; flexible actuating mechanism carried by the driven member and connecting said linkage to said pair of control valves; said mechanism positioning both of said control valves in a servo position whereby actuator movement is normally controlled solely by the servo valve, and said mechanism allowing relative movement between the control valves by the pilot's linkage in emergency servo operation to override actuator movement independently of the servo valve.

2. An aircraft control system for effecting movement of a control surface comprising a hydraulic actuator having a cylinder member and a tandem piston member, one of which is a driven member articulated to said control surface; a source of pressurized fluid for driving said driven member; a pair of mechanically operated hydraulic valves, each valve being cognizant for controlling the porting of said fluid to both sides of a respective piston and for determining the direction of actuator movement; an electrically operated hydraulic servo valve hydraulically interposed between said source of pressurized fluid and said pair of control valves for alternatively porting said fluid to said control valves in response to electrical command signals; pilot stick linkage having lost motion limit means; flexible actuating mechanism carried by the driven member connecting said linkage to said pair of control valves through said limit means; said mechanism positioning both of said control valves in a servo position whereby actuator movement within said limit means is normally controlled solely by the servo valve, and allowing relative movement of a cognizant control valve with respect to the other valve by the pilot's linkage in emergency servo operation when the actuator movement exceeds said limit means to override actuator movement independently of the servo valve, said mechanism being adjustable to a position where the control valves are movable together for normal pilot control of actuator movement.

3. The control system of claim 2 wherein said actuating mechanism is adjustable in two positions, one position in which the control valves are positioned for servo control of actuator movement, and a second position where the control valves are positioned for normal pilot control.

4. The control system of claim 2 wherein said actuating mechanism includes resilient means for biasing said control valves in a normal servo position.

5. The control system of claim 2 wherein said control valves are provided with two sources of pressurized fluid, one source being directed through said servo valve, a second source bypassing said servo valve, and a pair of transfer valves for connecting the control valves to either source.

6. The control system of claim 2 wherein said limit means in the pilot linkage is adjustable.

7. An aircraft control system for effecting movement of a control surface comprising a hydraulic actuator including a pair of pistons in tandem disposed in separate chambers in a cylinder articulated to said control surface; two sources of pressurized fluid for driving said driven member; a pair of transfer valves for selecting one of said sources; a pair of mechanical operated hydraulic valves, each valve controlling the porting of said fluid from a selected source to both sides of a respective piston and determining the direction of actuator movement; each control valve being a cognizant valve for a particular direction of actuator movement and being actuated by a pivotally mounted control arm; stop means for limiting the movement of said arms; an electrically operated hydraulic servo valve hydraulically interposed between one of said sources of pressurized fluid and said pair of control valves for alternatively porting said fluid to said control valves in response to electrical command signals; two-position actuating mechanism carried by the cylinder and connecting said control arms to a pilot's stick linkage, said mechanism including resilient means acting on the control arms for independently biasing each of said pair of valves to a servo position whereby said actuator is controlled electrically through the servo valve; preset lost motion limit means interconnecting said linkage to the actuating mechanism enabling said actuator to operate solely under servo control within preset limits, said limit means directly connecting the actuating mechanism to said pilot linkage in actuator movements beyond said preset limits for manually reversing the position of said cognizant control valve and the direction of actuator movement for overriding the servo control; said actuating mechanism being adjustable to a second position locking said control arms together wherein the control valves are movable together for normal pilot control of actuator movement; said transfer valves being movable in normal pilot control for selecting said second fluid source bypassing the servo valve.

8. The system of claim 7 wherein said mechanism includes a pair of push rods each adjustably positioned in two positions, each push rod having a pair of spaced shoulders between which is slidably mounted a sleeve pivotally mounted to a corresponding push rod, and spring means positioned between one of said shoulders and the sleeve for biasing said arms in one direction.

References Cited in the file of this patent

UNITED STATES PATENTS

| | | |
|---|---|---|
| 2,753,134 | Gordon et al. | July 3, 1956 |
| 2,823,879 | Smith et al. | Feb. 18, 1958 |
| 2,824,712 | Rasmussen et al. | Feb. 25, 1958 |

FOREIGN PATENTS

| | | |
|---|---|---|
| 661,120 | Great Britain | Nov. 14, 1951 |